(12) United States Patent
Choudhary et al.

(10) Patent No.: US 11,317,456 B2
(45) Date of Patent: Apr. 26, 2022

(54) METHOD AND SYSTEM FOR HANDLING DATA PATH CREATION IN WIRELESS NETWORK SYSTEM

(71) Applicant: SAMSUNG ELECTRONICS CO., LTD., Suwon-si (KR)

(72) Inventors: Gunjan Kumar Choudhary, Bengaluru (IN); Madhan Raj Kanagarathinam, Bengaluru (IN); HariKrishnan Natarajan, Bengaluru (IN); Karthikeyan Arunachalam, Bangalore (IN); Gyanchandani Monty, Bengaluru (IN); Rohit Shankar Lingappa, Bengaluru (IN); Jamsheed Manja Ppallan, Bengaluru (IN); Sujith Rengan Jayaseelan, Bangalore (IN); Chhaya Bharti, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/384,040

(22) Filed: Apr. 15, 2019

(65) Prior Publication Data
US 2019/0320479 A1    Oct. 17, 2019

(30) Foreign Application Priority Data

Apr. 13, 2018   (IN) .............................. 201841014113
Apr. 11, 2019   (IN) .............................. 201841014113

(51) Int. Cl.
*H04W 76/15*   (2018.01)
*H04W 24/08*   (2009.01)
(Continued)

(52) U.S. Cl.
CPC ............. *H04W 76/15* (2018.02); *H04L 69/16* (2013.01); *H04W 24/08* (2013.01); *H04W 28/0278* (2013.01)

(58) Field of Classification Search
CPC ...................................................... H04W 76/15
See application file for complete search history.

(56) References Cited

U.S. PATENT DOCUMENTS 9,961,169 B1 *    5/2018   Koster .................... H04L 69/18
2005/0015509 A1 * 1/2005   Sitaraman ............. H04L 69/329
                                                      709/231
(Continued)

FOREIGN PATENT DOCUMENTS

WO          2017167392 A1     10/2017

OTHER PUBLICATIONS

"QUIC: A UDP-Based Secure and Reliable Transport for HTTP/2 draft-tsvwg-quic-protocol-00" by J. Iyengar et al., Network Working Group, Internet-Draft, pp. 1-30. (Year: 2015).*
(Continued)

*Primary Examiner* — Edan Orgad
*Assistant Examiner* — Won Tae C Kim
(74) *Attorney, Agent, or Firm* — Sughrue Mion, PLLC

(57) ABSTRACT

A method and apparatus are provided for handling a data path creation in a quick user datagram protocol (UDP) Internet connection (QUIC) session in a wireless network system. The method includes receiving, by an electronic device, at least one request from at least one application for processing at least one object, determining at least one network condition based on the plurality of parameters associated with the electronic device, determining whether the at least one network condition meets a network criteria, and creating a number of data paths within the QUIC session based on the determination.

8 Claims, 19 Drawing Sheets

(51) Int. Cl.
*H04W 28/02* (2009.01)
*H04L 29/06* (2006.01)
*H04L 69/16* (2022.01)

(56) References Cited

U.S. PATENT DOCUMENTS

| | | | |
|---|---|---|---|
| 2014/0258705 | A1 | 9/2014 | Roskind et al. |
| 2016/0094862 | A1* | 3/2016 | Aoki .................. H04N 21/2405 725/116 |
| 2016/0242059 | A1* | 8/2016 | Lopes .................. H04W 24/02 |
| 2017/0331918 | A1 | 11/2017 | Szabo et al. |
| 2017/0353386 | A1 | 12/2017 | Wang et al. |
| 2018/0063853 | A1* | 3/2018 | Szabo .................. H04W 72/10 |
| 2019/0053199 | A1* | 2/2019 | Fujishiro ............... H04W 72/04 |
| 2021/0168840 | A1* | 6/2021 | Han .................. H04W 72/1284 |

OTHER PUBLICATIONS

International Search Report and Written Opinion (PCT/ISA/210 and PCT/ISA/237), dated Jul. 12, 2019 by International Searching Authority in International Application No. PCT/KR2019/004517.

Sarah Cook et al. "QUIC: Better For What And For Whom?" IEEE International Conference on Communications (ICC2017), Jul. 31, 2017, (8 pages total).

R. Hamilton et al. "QUIC: A UDP-Based Secure and Reliable Transport for HTTP/2 draft-hamilton-early-deployment-quic-00" Network Working Group, Jul. 8, 2016, (pp. 1-36).

Q. De Coninck et al., "Multipath Extension for QUIC; draft-deconinck-multipath-quic-00", Internet Society (ISOC), XP015122673, Oct. 30, 2017, pp. 1-20 (20 pages total).

Communication dated Jan. 18, 2021, from the European Patent Office in European Application No. 19784507.6.

* cited by examiner

QUIC PIPELINING

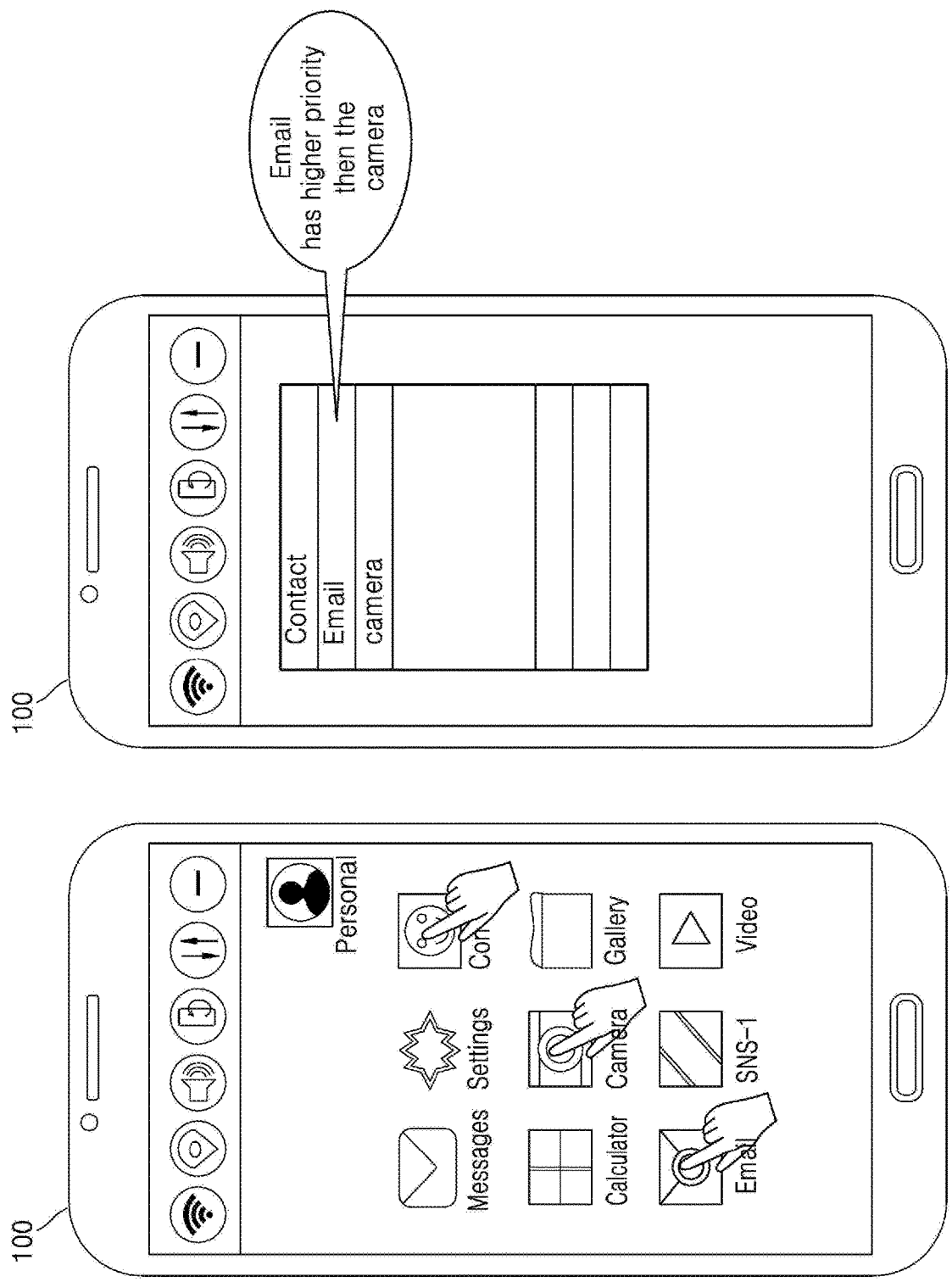

METHOD AND SYSTEM FOR HANDLING DATA PATH CREATION IN WIRELESS NETWORK SYSTEM

CROSS-REFERENCE TO RELATED APPLICATION(S)

The present application claims benefit of priority from Indian Provisional Patent Application Number 201841014113 filed on 13 Apr. 2018, and Indian Complete Patent Application Number 201841014113 filed on Apr. 11, 2019, the disclosures of both of which are hereby incorporated by reference herein in their entirety.

BACKGROUND

1. Field

The disclosure relates to a wireless network system, and more specifically related to a method and system for handling data path creation in the wireless network system.

2. Description of Related Art

Hyper Text Transfer Protocol (HTTP) is an application protocol commonly used by many applications. HTTP/2, a major revision of HTTP, was standardized in 2015 and is an evolution to HTTP; it addresses many issues of HTTP. Running on top of Transmission Control Protocol (TCP), HTTP/2 faces performance challenges. Hence, existing systems uses a Quick UDP(User Datagram Protocol) Internet Connections (QUIC). QUIC provides a secured transport layer network protocol which improves perceived performance of web applications. QUIC is a secure multiplexing transport protocol that runs on top of UDP.

Currently, QUIC does not prioritize the streams or objects inside the pipe. For example, a pipe may refer to a connection between endpoints. The performance of web applications has a high dependency on web object loading. For example, a JavaScript file should be loaded prior to other contents. Also considering an example of a streaming service, the actual video playing must be prioritized over the other objects such as advertisements, suggested videos, etc.

Thus, it is desired to address the above mentioned disadvantages or other shortcomings.

SUMMARY

In some embodiments, a method is provided for handling data path creation in a quick user datagram protocol (UDP) Internet connection (QUIC) session in a wireless network system, including: receiving, by an electronic device, at least one request from at least one application for processing at least one object; determining, by the electronic device, at least one network condition based on a plurality of parameters associated with the electronic device; determining, by the electronic device, whether the at least one network condition meets a network criterion; and creating, by the electronic device, a one or more data paths within the QUIC session based on the determining, wherein a quantity of the one or more data paths is a first number.

In some embodiments, the method includes scheduling the at least one object to be sent over the one or more data paths based on burst information.

In some embodiments, the plurality of parameters comprises one or more of a network awareness parameter, a connection parameter, or a context parameter associated with the at least one object.

In some embodiments, the network awareness parameter is determined based on a radio condition, and the radio condition is determined based on one or more of interface connection information, Radio Access Technology (RAT) information, or a signal strength observed by the electronic device.

In some embodiments, the connection parameter is determined based on one or more of an end-to-end latency, a packet loss rate, a window information, or a retransmission rate fetched from a QUIC library component.

In some embodiments, the context parameter is determined based on one or more of a type of the at least one object, a foreground activity, a background activity or a priority associated with the at least one object.

In some embodiments, the creating of the one or more data paths further includes: determining the first number based on the plurality of parameters and based on the at least one object; estimating a buffer size for each data path of the one or more data paths based on an interface connection; and creating the one or more data paths based on the buffer size.

In some embodiments, the buffer size is configured based on the plurality of parameters and based on at least one property of the at least one object.

In some embodiments, the creating of the one or more data paths includes: determining the first number based on the plurality of parameters; determining at least one property of the at least one object; and creating the one or more data paths based on the at least one property of the at least one object.

In some embodiments, the at least one property comprises one or more of a size of the at least one object, a number of the at least one object, or a priority of the at least one object.

In some embodiments, the creating of the one or more data paths further includes: configuring a single data path for data packets of an incoming media stream, wherein the incoming media stream includes the at least one object, wherein the at least one object is to be transmitted through a server; estimating burst information associated with the incoming media stream and one or more of: i) a network awareness parameter and ii) a connection parameter for subsequent incoming media streams; and creating, based on the burst information, the one or more data paths to accommodate and transmit the subsequent incoming media streams.

In some embodiments, the network criterion indicates, based on the plurality of parameters, a utilization of a resource in the QUIC session.

Also provided is an electronic device for handling data path in a quick user datagram protocol (UDP) Internet connection (QUIC) session in a wireless network system, including: a memory; and at least one processor configured to: receive at least one request from at least one application for processing at least one object; determine at least one network condition based on a plurality of parameters associated with the electronic device; determine whether the at least one network condition meets a network criterion; and create one or more data paths within the QUIC session based on the determining, wherein a quantity of the one or more data paths is a first number.

In some embodiments of the electronic device, the plurality of parameters comprises one or more of a network awareness parameter, a connection parameter, or a context parameter associated with the at least one object.

In some embodiments of the electronic device, the at least one processor is further configured to: determine the first number of data paths to be created based on the plurality of parameters and based on the at least one object; estimate a buffer size for each data path of the one or more data paths based on an interface connection; and create the one or more data paths based on the buffer size.

In some embodiments of the electronic device, the at least one processor is further configured to: determine the first number based on the plurality of parameters, wherein the plurality of parameters include cross-layer parameters; determine at least one property of the at least one object; and create the one or more data paths based on the at least one property.

In some embodiments of the electronic device, the at least one processor is further configured to: configure a single data path for data packets of an incoming media stream, wherein the incoming media stream includes the at least one object, wherein the at least one object is to be transmitted through a server; estimate burst information associated with the incoming media stream and one or more of: i) a network awareness parameter and ii) a connection parameter for subsequent incoming media streams; and create, based on the burst information, the one or more data paths to accommodate and transmit the subsequent incoming media streams.

Also provided, in some embodiments, is an additional method for handling data path in a Cross-Layer Burst Aware MultiPipe quick user datagram protocol (UDP) Internet connection (QUIC) (CBA MP-QUIC) network session in a wireless network system, including: determining, by an electronic device, one or more of a content property of a media stream incoming into a server, network characteristics and connection parameters; configuring, by the electronic device, at least one first data path for data packets of the incoming media stream to be transmitted via the server; checking, by the electronic device, a burst estimation along with the network characteristics and the connection parameters for the subsequent incoming media streams; and configuring, by the electronic device, one or more second data paths to accommodate and transmit subsequent media streams to manage resources for the CBA MP-QUIC network session via the server.

In some embodiments of the additional method, the network characteristics include one or more of information related to interface connection, Radio Access Technology (RAT) information, or radio conditions, wherein the connection parameters include one or more of information related to an end-to-end latency, a packet loss rate, a receive window, or a retransmission rate, and wherein the content properties include one or more of information related to a type of content, content characteristics, a content activity, or a content priority.

In some embodiments of the additional method, the configuring one or more second data paths further comprises: classifying the network characteristics, the connection parameters and the content properties; assigning a particular score for the network characteristics, the connection parameters and the content properties; combining the estimated burst information with the particular score; and configuring the one or more second data paths to accommodate and transmit subsequent media streams via the server based on the combined estimated burst information and particular score.

In some embodiments of the additional method, the first data path is one pipe.

In some embodiments of the additional method, the first data path is one QUIC stream.

Features may be combined between embodiments.

In addition, the embodiments herein provide a method for handling data path creation in a quick user datagram protocol (UDP) Internet connection (QUIC) session in a wireless network system. The method includes receiving, by an electronic device, at least one request from at least one application for processing at least one object. Further, the method includes determining, by the electronic device, at least one network condition based on a plurality of parameters associated with the electronic device. Further, the method includes determining, by the electronic device, whether the at least one network condition meets a network criteria. Further, the method includes creating, by the electronic device, a number of data path within the QUIC session based on the determination.

In an embodiment, the plurality of parameters comprises at least one of a network awareness parameter, a connection parameter, or a context associated with the network condition.

In an embodiment, the network awareness parameter is determined based on a radio condition, and the radio condition is determined based on at least one of an interface connection information, a Radio Access Technology (RAT) information, or a signal strength of the electronic device.

In an embodiment, the connection parameter is determined based on at least one of an end-to-end latency, a packet loss rate, or a receive window information fetched from a QUIC library component.

In an embodiment, the context parameter is determined based on at least one of a type of the at least one object, a foreground activity, a background activity or a priority associated with each of object.

In an embodiment, the creating of the number of data paths within the QUIC session includes determining a number of data path to be created based on the parameters, estimating a buffer size associated with the data path based on an interface connection, and creating the number of data path within the QUIC session based on the buffer size.

In an embodiment, the buffer size is configured based on the parameters and at least one property of the at least one object.

In an embodiment, the creating of the number of data paths within the QUIC session includes determining a number of data paths to be created based on the parameters, determining at least one property of the at least one object, and creating the number of data path within the QUIC session based on the property.

In an embodiment, the at least one property comprises at least one of a size of the at least one object, a number of the object, or a priority of each object.

In an embodiment, scheduling the at least one object in the number of data path based on burst information.

In an embodiment, the network criteria indicates a utilization of a resource in the QUIC session based on the plurality of parameters. The resource is a bandwidth.

In an embodiment, the creating of the number of data paths within the QUIC session includes configuring a single data path for data packets of an incoming media stream comprising the at least one object to be transmitted through the server, estimating burst information, associated with the incoming media stream comprising the at least one object, along with at least one of the network awareness parameter and the connection parameter for a subsequent incoming media streams, and creating two or more data paths to accommodate and transmit the subsequent incoming media streams through the server based on the burst information.

Accordingly, the embodiments herein provide an electronic device for handling data path creation in a quick user datagram protocol (UDP) Internet connection (QUIC) session in a wireless network system. The electronic device includes a memory and at least one processor. The processor is configured to receive at least one request from at least one application for processing at least one object. Further, the processor is configured to determine at least one network condition based on a plurality of parameters. Further, the processor is configured to determine whether the at least one network condition meets a network criteria. Further, the processor is configured to create a number of data path within the QUIC session based on the determination.

Accordingly, the embodiments herein provide a method for handling data path in a Cross-Layer Burst Aware MultiPipe quick user datagram protocol (UDP) Internet connection (QUIC) (CBA MP-QUIC) network session in a wireless network system. The method includes determining, by an electronic device, at least one of a content property of an incoming media stream incoming into a server, network characteristics and connection parameters. Further, the method includes configuring, by the electronic device, at least one first data path for data packets of the incoming media stream to be transmitted via the server. Further, the method includes checking, by the electronic device, a burst estimation along with the network characteristics and the connection parameters for the subsequent incoming media streams. Further, the method includes configuring, by the electronic device (100), one or more second data paths to accommodate and transmit subsequent media streams to manage resources for the CBA MP-QUIC network session via the server.

In an embodiment, the network characteristics include at least one of information related to interface connection, Radio Access Technology (RAT) information, or radio conditions.

In an embodiment, the connection parameters include at least one of information related to an end-to-end latency, a packet loss rate, a receive window, or a retransmission rate.

In an embodiment, the content properties include at least one of information related to a type of content, content characteristics, a content activity, or a content priority.

In an embodiment, configuring one or more second data paths to accommodate and transmit subsequent the media streams via the server (200) includes classifying the network characteristics, the connection parameters and the content properties, assigning a particular score for the network characteristics, the connection parameters and the content properties, and combining the estimated burst along with the assigned score for configuring one or more second data paths to accommodate and transmit subsequent media streams via the server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 19 is an example scenario in which the electronic device prioritize the request based on a content/object awareness, according to an embodiment of the disclosure.

DETAILED DESCRIPTION

Figure 1:
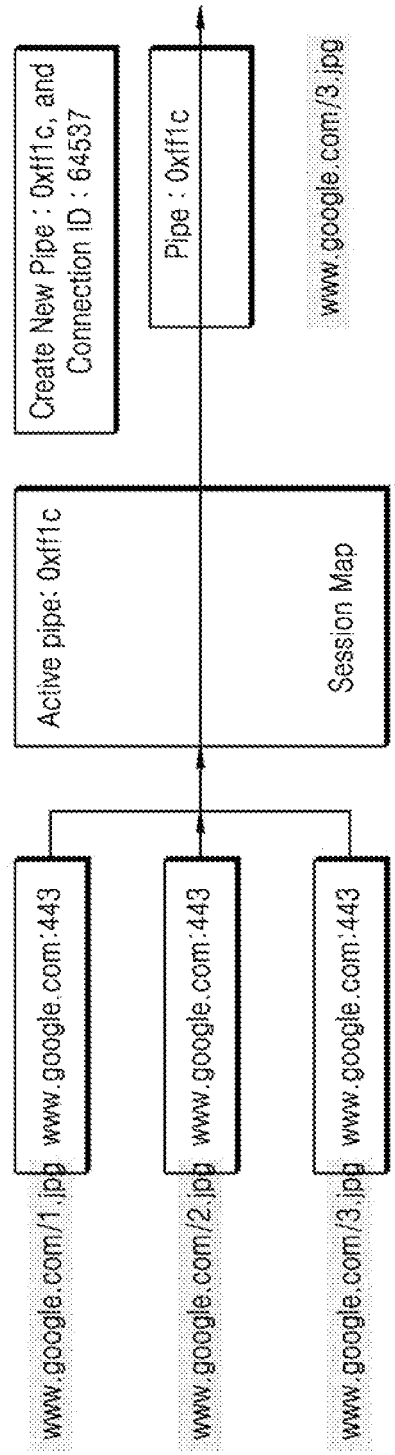
FIG. 1 is a schematic diagram illustrating a current implementation of a QUIC pipelining, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more of other embodiments to form new embodiments. The term "or" as used herein, refers to a "non-exclusive or", unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the embodiments. Likewise, the blocks of the embodiments may be physically combined into more complex blocks without departing from the scope of the embodiments.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The term "data path", "socket" and "pipe" are used interchangeably in the disclosure.

QUIC is a protocol which functionally replaces TCP. QUIC does not have the three way handshake and is able to provide 0-Round-trip time (0-RTT)/1-RTT connection. QUIC, combined with Transport Layer Security (TLS) version 1.3, provides critical latency improvements for connection establishment. TLS 1.3 provides two basic handshake mode of interest to QUIC: a) a full 1-RTT handshake in which a client is able to send application data after one round trip and a server immediately responds after receiving the first handshake message from the client, and b) a 0-RTT handshake in which the client uses information it has previously learned about a server to send application data immediately. This application data can be replayed by an attacker so the application data must not carry a self-contained trigger for any non-idempotent action.

QUIC uses multiplexing pipelining, so that, using existing methods, multiple connections/streams/objects can be sent in one socket or pipe. HTTP/2 uses the same based on underlying transport layer being TCP, and the packets are delivered in-order to a given application. However, QUIC adapts two levels of flow control which allows adjustment of the aggregate buffer for an entire connection. HTTP 1.1 usually uses multiple sockets for streams for better network utilization. Though an initial mode of the QUIC is for web applications, with the advent of better error correction mechanisms, QUIC is also used for streaming and download services. Because QUIC is still experimental, it is not much used for streaming and download services. However, with the increase in the demand for QUIC which currently accounts to more than 5% of internet traffic, migration of these services to QUIC may occur soon. The QUIC working group foresees Multipath support, forward-error correction (FEC) and also network management issues to be worked on. Due to the bursty and dynamic nature of next generation mobile data traffic, there may be sporadic losses caused due to high Bit Error Rate (BER), network signal condition changes, mobility events, congested paths, hand-off problems, lengthy or frequent disconnections and the like. On the other hand, from the experiments, it is found that the link utilization in the wireless network with single pipe is less than multi connection HTTP.

Figure 2:
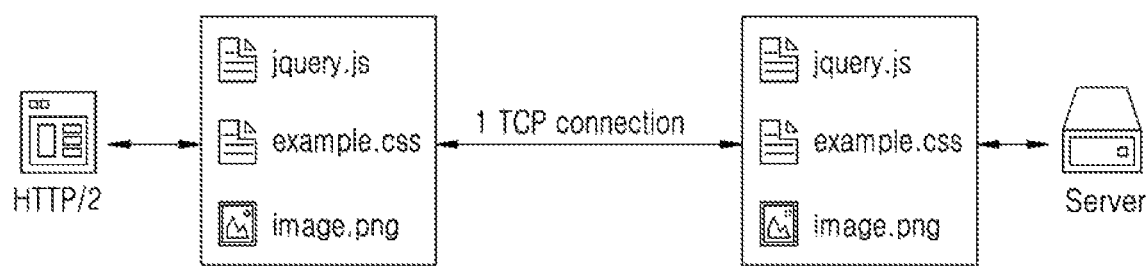
FIG. 2 is a schematic diagram illustrating a current implementation of a QUIC pipelining, according to the prior art.

FIG. 1 and FIG. 2 are schematic diagrams illustrating a current implementation of QUIC pipelining, according to the prior art. As shown in the FIG. 1, it depicts the QUIC pipelining concept where multiple requests share the same session when the end server is same. Each request and response is multiplexed over the same session. The same can be seen in the FIG. 2 in which HTTP/2 also has the same logic, but where a QUIC session is created over the UDP while in HTTP/2 the session is over TCP.

Figure 3:
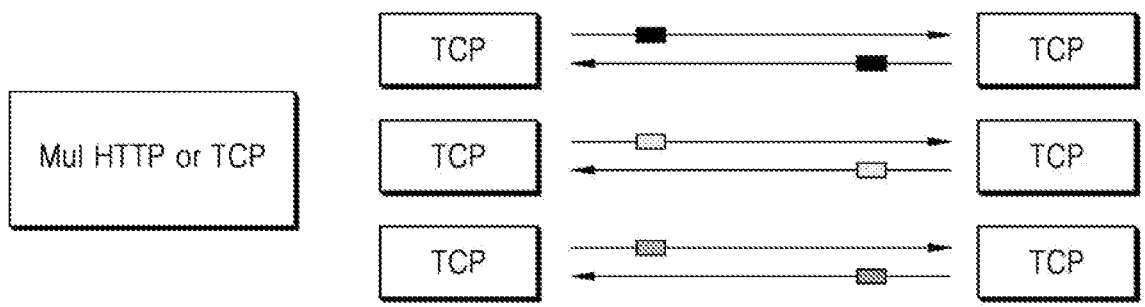
FIG. 3 is a schematic diagram illustrating a current implementation of a Mul HTTP or TCP pipelining, according to the prior art.

FIG. 3 is a schematic diagram illustrating a current implementation of a Mul HTTP or TCP pipelining, according to the prior art. It depicts another existing solution where each request is sent over one TCP session.

The embodiments herein achieve a method for handling data path creation in a quick user datagram protocol (UDP) Internet connection (QUIC) session in a wireless network system. The method includes receiving, by an electronic device, at least one request from at least one application for processing at least one object. Further, the method includes determining, by the electronic device, at least one network condition based on the plurality of parameters. Further, the method includes determining, by the electronic device, whether the at least one network condition meets a network criteria. Further, the method includes creating, by the electronic device, a number of data paths within the QUIC session based on the determination.

The proposed methods can be used to efficiently manage/prioritize QUIC data paths based on the object and path characteristics. Further, the method uses a priority aware multiplexed multi data path/multisession QUIC scheduler to improve effectiveness on an underutilized network and a lossy network and also to prioritize the objects for better Quality of experience (QoE). In the proposed method, a page loading time is reduced depending on the content properties and the network environment.

The proposed method can be used to adapt to the network and operational conditions dynamically using CBA(Cross layer Burst Aware) multi data path QUIC (MP-QUIC). This results in improving the PLT (Page Loading Time). The method can be used to efficiently create sessions based on recognized parameters (e.g., cross-layer parameters). This disclosure provides for prioritizing the objects to be fetched and scheduling in an effective manner. The proposed method can be used to efficiently and reliably schedule the objects based on the parameters. This results in reducing the data and memory processing requirement in electronic devices and enhances the user experience. The method can be used to load the objects in a better way to enhance the Quality of Experience (QoE).

Referring now to the drawings, and more particularly to FIGS. 4 through 19, where similar reference characters denote corresponding features consistently throughout the figures, embodiments are illustrated.

Figure 4:
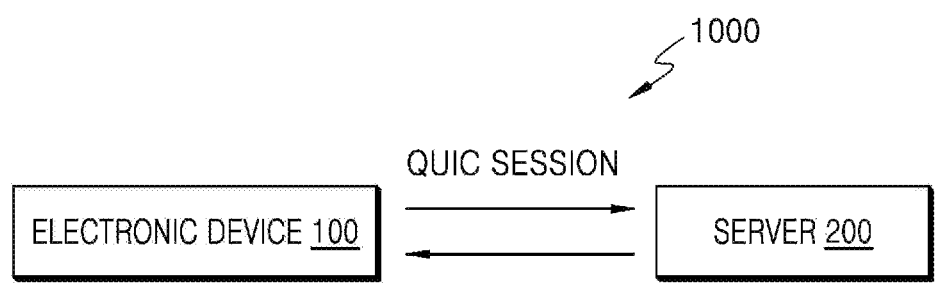
FIG. 4 illustrates a wireless network system for handling data path creation, according to an embodiment of the disclosure.

FIG. 4 illustrates a wireless network system 1000 for handling data path creation, according to an embodiment of the disclosure. In an embodiment, the wireless network system 1000 may include an electronic device 100 and a server 200. The electronic device 100 can be, for example, but not limited to a cellular phone, a smart phone, a Personal Digital Assistant (PDA), a tablet computer, a laptop computer, a smart social robot, a smart watch, a music player, a video player, an Internet of things (IoT) device or the like.

The electronic device 100 may receive or obtain at least one request from at least one application for processing at least one object. The object can be, in a non-limiting example, a content in an application (e.g., web application, social networking application, a game application, or the like). The content can be, in a non-limiting example, a web content, a video content, an audio content, an advertisement, or the like. After receiving the at least one request, the electronic device 100 is configured to determine at least one network condition based on a plurality of parameters (e.g. cross layer parameters).

The plurality of parameters, can be, for example, but not limited to, a network awareness parameter, a connection parameter, a context parameter and a property of the object. The property can be, in a non-limiting example, a size of the object, a number of the object, and a priority of the object.

In an embodiment, the network awareness parameter may be determined by determining a radio interface layer (RIL) indicating information comprising at least one of an interface connection information, a RAT information, or a signal strength observed by the electronic device 100, determining a radio condition information based on the information indicated by the RIL, and determining the network awareness parameter based on the radio condition information.

In an embodiment, the connection parameter may be determined by fetching a connection specific parameter from a QUIC library component, wherein the connection specific parameter comprises at least one of an end-to-end latency, a packet loss rate, a retransmission rate and a receive window information, or determining the connection parameter based on the connection specific parameter.

In an embodiment, the context may be determined based on at least one of a type of object, a foreground activity, a background activity or a priority associated with each of object.

Further, the electronic device 100 may determine whether the at least one network condition meets a network criteria. The network criteria indicates a utilization of a resource in the QUIC session based on the plurality of parameters. The resource is a bandwidth. Further, the electronic device 100 may automatically create a number of data path/pipe/socket within the QUIC session based on the determination. The electronic device 100 may automatically create the number of data path/pipe/socket within the QUIC session based on the object properties, current electronic device conditions and server conditions.

In an embodiment, the number of data paths may be created within the QUIC session by determining a number of data paths to be created based on the parameters, estimating a buffer size for each data path based on an interface connection, and automatically creating the number of data paths within the QUIC session based on the buffer size.

In an embodiment, the buffer size of the data paths may be automatically tuned based on the cross-layer parameters.

In an embodiment, the number of data paths may be created within the QUIC session by determining a number of data path to be created based on the parameters, and automatically creating the plurality of data paths within the QUIC session based on the number of data paths.

In an embodiment, the plurality of data paths may be automatically created within the QUIC session by determining at least one of property. The property can be, for example, but not limited to the size of the object, a number of the object, and a priority of each objects.

Further, the electronic device 100 may schedule the at least one object in data paths based on the burst information. The burst information corresponds to object burst time and an allocated burst limit of each data path/socket/pipe.

Figure 5:
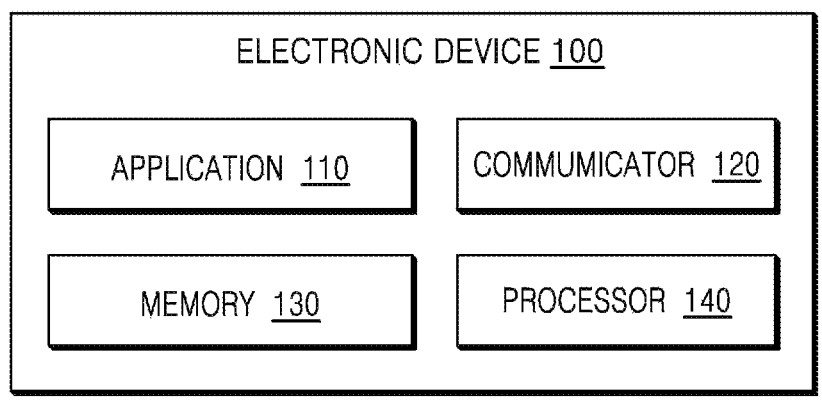
FIG. 5 is a block diagram of an electronic device for handling multi pipe creation in the wireless network system, according to an embodiment of the disclosure.

FIG. 5 is a block diagram of the electronic device 100 for handling multi data paths creation in the wireless network system 1000, according to an embodiment of the disclosure. In an embodiment, the electronic device 100 may comprise, but not limited to, the application 440110, a communicator 120, a memory 130, and a processor 140. The application 110 can be, for example, but not limited to a big data analytics application, an in-memory databases, a gaming application, a web application, a social networking application or the like.

The processor 140 is coupled with the communicator 120, the memory 130 and the application 110. The processor 140 may receive the at least one request from at least one application 110 for obtaining the at least one object. Based on the at least one request, the processor 140 may create the QUIC session. After creating the QUIC session, the processor 140 may determine the plurality of parameters associated with the electronic device.

Based on the plurality of parameters, the processor 140 may determine at least one network condition. Based on the network condition, the processor 140 may determine whether the at least one network condition meets the network criteria. Based on the determination, the processor 140 may automatically create the optimal data path within the QUIC session.

In an embodiment, the processor 140 may automatically create the optimal data path within the QUIC session based on the burst estimation of upcoming/future/predicted data packets.

In an embodiment, the processor 140 may determine at least one of a content property of an incoming media stream comprising the at least one object incoming into the server 200, the network awareness parameter and the connection parameters. The processor 140 configures at least one data path for data packets of the incoming media stream comprising the at least one object to be transmitted via the server 200. The processor 140 may determine the burst estimation, associated with the incoming media stream comprising the at least one object, along with the network awareness parameter and the connection parameters for the subsequent incoming media streams. Further, the processor 140 configures second, one or more paths to accommodate and transmit subsequent media streams via the server 200.

The processor 140 may execute instructions stored in the memory 130 and to perform various processes. The communicator 120 is configured for communicating internally between internal hardware components and with external devices via one or more networks.

The memory 130 may store instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although the FIG. 5 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the embodiments. One or more components can be combined together to perform same or substantially similar function to handle the multi data paths creation in the wireless network system 1000.

Figure 6:
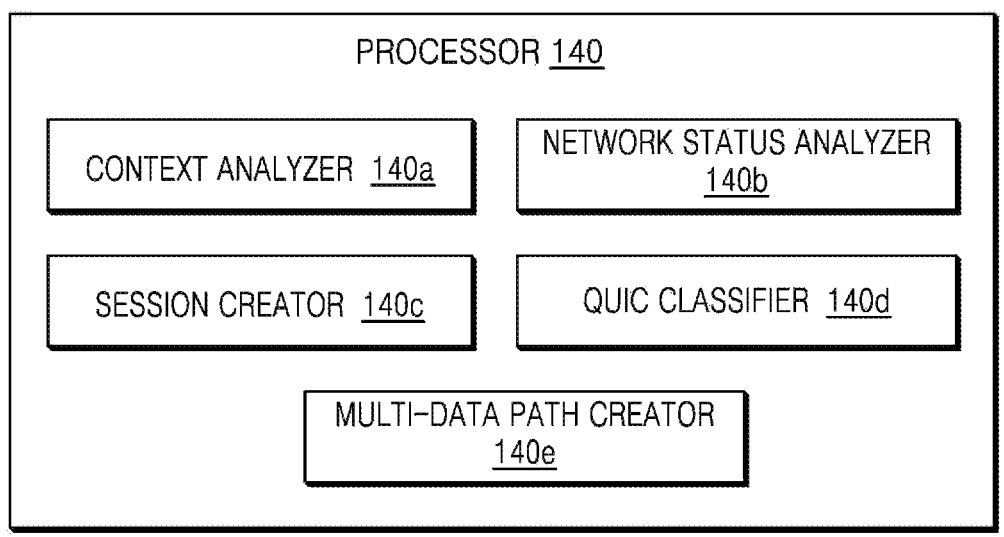
FIG. 6 illustrates various elements of a processor of the electronic device for handling multi data paths creation in the wireless network system, according to an embodiment of the disclosure.

FIG. 6 illustrates various elements of the processor 140 of the electronic device 100 for handling multi data paths creation in the wireless network system 1000, according to an embodiment of the disclosure. In an embodiment, the processor 140 may include, but not limited to, a context analyzer 140a, a network status analyzer 140b, a session creator 140c, a QUIC classifier 140d, and a multi-data path creator 140e. One or more of the 140a, 140b, 140c, 140d, and/or 140e may be implemented by at least one processor executing instructions read from a memory.

Further, the session creator 140c may include at least one of a one-to-one path manager (1:1 one path manger), a Round Robin (RR) path manager, a ToS and QoS aware path manager, or a Cross Layer Burst Aware (CBA) path manager. One or more of the one-to-one path manager (1:1 one path manger), the Round Robin (RR) path manager, the ToS and QoS aware path manager, and/or the Cross Layer Burst Aware (CBA) path manager may be implemented by at least one processor executing instructions read from a memory.

The one-to-one path manager, the RR path manager, the ToS and QoS aware path manager, and the CBA path manager may be used for crating the data path (i.e., pipe/socket) using the data path creator 140e. The path managers may fetch the information from the cross-layer regarding the current network/operational/context characteristics. The path managers may schedule the objects efficiently based on the aware of the burst in each data paths using the data path creator 140e.

The 1:1 path manager may act as a scheduler. The 1:1 path manager may create each connection as an individual pipe or individual data path. Further, the RR path manager may create and open the selective number of the QUIC data paths and the objects are allocated in round robin fashion.

In the ToS and QoS aware path manager, the multi-data path may know about, or have access to, the object properties such as Type of Service (ToS) and the Quality of Service (QoS) of the specific objects. The priority based multi-data path may be created and the objects are scheduled based on its property.

The CBA path manager may obtain the feedback from multiple layers to effective schedule and manage the multi-pipe scheduling scenario. Further, the CBA path manager may adopt multi-pipe QUIC and aware of the cross layer feedbacks schedules the objects efficiently. Based on the proposed methods, in an idle condition, the single pipeline is enough to process all the objects. The number of multi-data path to be create and the object scheduling order is always fixed.

The CBA path manager may be designed to work in fair and efficient manner. The CBA path manager may receive the feedback from multiple cross layers and understands, or have access to, the current conditions. The CBA path manager may run in the electronic device 100 (e.g., mobile devices) and understand, or have access to, the current wireless conditions and works agnostic to a server side implementations.

After determining the maximum number of multi-data path and the buffer size for the each data path, the session creator 140c can be used to derive the available burst estimation of each data path. This is a dynamic module, which updates based on object download start/progress/completion.

The session creator 140c may create the multiple pipelines/data paths/socket that impacts the experience mainly for the short lived connections. The session creator 140c may create the multi pipe session using the on-demand (OD) procedure or enhanced on-demand (OD+) procedure. The session creator 140c may create the plurality of data paths and the object can be scheduled redundantly in at least two of the created data paths.

The QUIC classifier 140d may classify the network characteristics, connection characteristics, and content properties based on the information fetched by the path manager. The content properties may include information related to the type of content (such as Video, Audio, Text, Download, CSS, etc.), the content characteristics (such as number of objects to be loaded), the content activity (if the content is in foreground or background, if the frame is current or next), and the content priority (high, low or normal). Based on the estimated value, the CBA classifier 140d may assign three scores(weights, values) (i.e., excellent, good and poor). This information (i.e., score) may be passed to the CBA session creator 140c to identify the maximum multi data path to be created and the size of each pipe.

The CBA session creator 140c may assign the optimized resource for the session by identifying a number of data path to be created, size of each data path (i.e., buffer information) and burst estimation of each pipe based on the assigned weight. The CBA session creator 140c may create plurality of data paths based on the on-demand method. The CBA session creator 140c may create the pipes based on an enhanced on-demand method. In the enhanced on-demand method, at least one data path may be created in advance based on the maximum number of data path calculation to reduce the latency. The CBA session creator 140c can create plurality of data paths and the object can be scheduled redundantly in at least two of the created data paths. The on-demand method and the enhanced on-demand method are explained in the FIG. 11-FIG. 15.

In an example, the sessions may be created based on the signal strength, RAT type and radio conditions using the network status analyzer 140b. The radio conditions can be, for example, but not limited to a Signal to Noise Raito (SINR), Reference Signal Received Power (RSRP), and a Reference Signal Received Quality (RSRQ).

In another example, the sessions may be created based on the end to end connection parameter (e.g., latency, packet loss rate, receive window, a retransmission rate or the like) using the network status analyzer 140b. In another example, the sessions may be created based on context level parameters (such as object type, number of objects, user activity or the like) using the context analyzer 140a.

In an embodiment, the context analyzer 140a, the network status analyzer 140b, the session creator 140c, the QUIC classifier 140d and the multi-data path creator 140e may be implemented as at least one hardware processor.

Although FIG. 6 shows various hardware components of the processor 140 but it is to be understood that other embodiments are not limited thereon. In other embodiments, the processor 140 may include less or more number of components. Further, the labels or names of the components are used only for illustrative purpose and does not limit the scope of the embodiments. One or more components can be combined together to perform same or substantially similar function to handle the multi data path creation in the wireless network system 1000.

Figure 7:
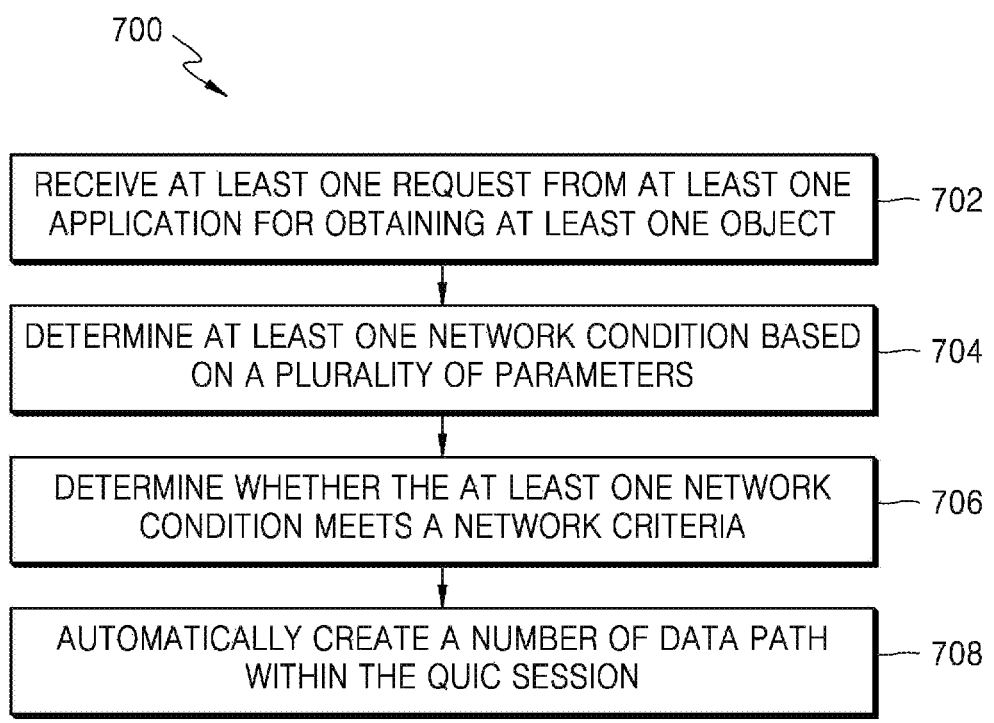
FIG. 7 is a flow chart illustrating a method for handling the data path creation in the wireless network system, according to an embodiment of the disclosure.

FIG. 7 is a flow chart 700 illustrating a method for handling the data path in the wireless network system 1000, according to an embodiment of the disclosure. The operations (702-708) are performed by the processor 140. At 702, the method includes receiving the at least one request from the at least one application 110 for obtaining the at least one object. At 704, the method includes determining the at least one network condition based on the plurality of parameters. At 706, the method includes determining whether the at least one network condition meets the network criteria. At 708, the method includes automatically creating the number of data path within the QUIC session.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the embodiments.

Figure 8:
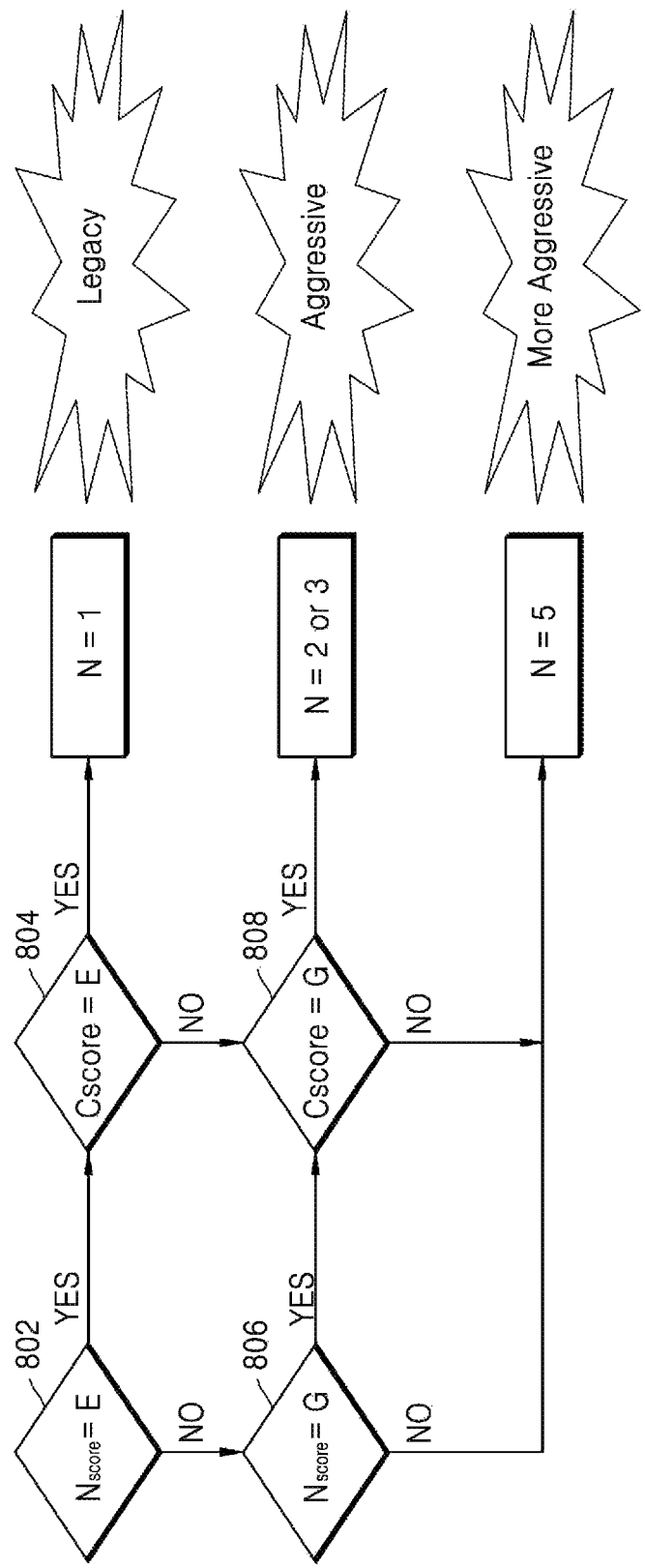
FIG. 8 is an example flow diagram illustrating how many data path has to be created based on network aware parameters and connection parameters, according to an embodiment of the disclosure.

FIG. 8 is an example flow diagram illustrating how many data paths has to be created based on the network aware parameters and the connection aware parameters, according to an embodiment of the disclosure.

At 802, the processor 140 may determine whether the network awareness score ($N_{score}$) is excellent. When the network awareness score ($N_{score}$) is excellent then, at 804, the processor 140 determines whether the connection awareness score ($C_{score}$) is good or excellent. When the connection awareness score ($C_{score}$) is excellent then, the processor 140 creates single data path.

At 806, the processor 140 may determine whether the network awareness score ($N_{score}$) is good. When the network awareness score is good then, at 808, the processor 140 determines whether the connection awareness score ($C_{score}$) is good (or excellent). When the connection awareness score ($C_{score}$) is good (or excellent) the processor 140 creates two or three pipes. Generally, a pipe may be a data path or QUIC stream as used herein.

When the at least one of the network awareness score ($N_{score}$) or the connection awareness score is not good ( ) then, the processor 140 may create five or more pipes.

However, operations of the processor 140 are not limited to the FIG. 8. The processor 140 may determine the number of pipes (data paths) based on at least one parameter (such as the network awareness score and the connection awareness score, etc). The processor 140 may optimize the usage of resources, i.e. CBA creates the optimized sessions based on the context aware, application aware or the like. The proposed method can be used to decrease the latency in the lossy network, where multi data path are used to fetch different objects.

Figure 9:
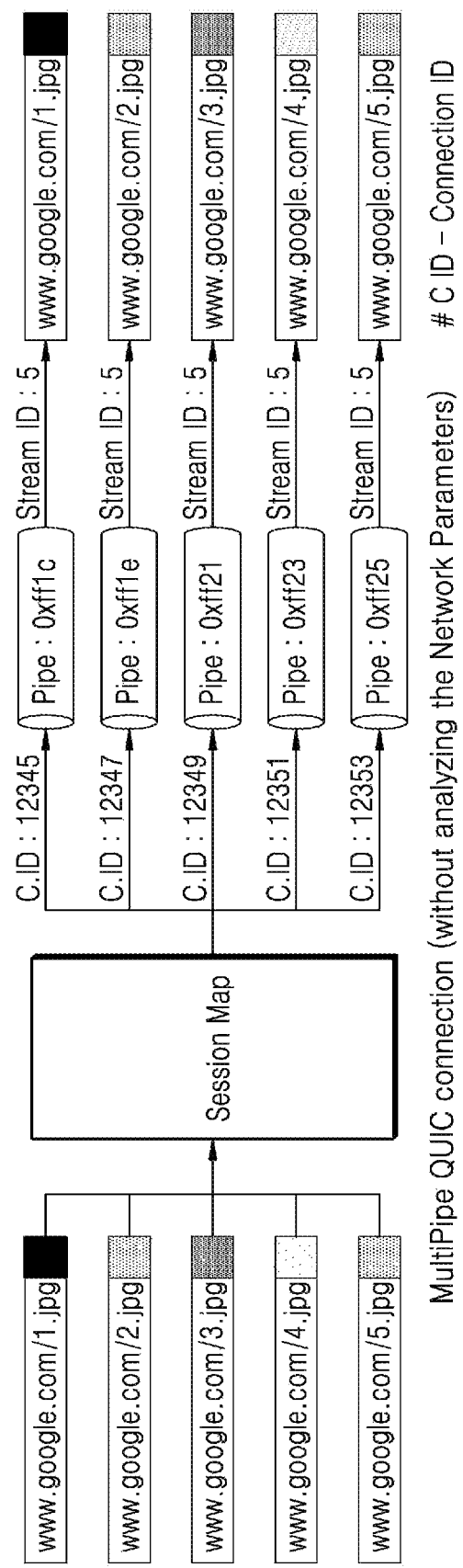
FIG. 9 is an example illustration in which multi-data path creation of a QUIC session is depicted, according to an embodiment of the disclosure.

FIG. 9 is an example illustration in which multi-data path creation of the QUIC session is depicted, according to an embodiment of the disclosure. As shown in the FIG. 9, the figure illustrates that the session manager, at the QUIC, aggressively creates the QUIC session without checking the QUIC level parameters and network parameters and then five QUIC sessions are created. In a worst case scenario the network conditions as well as the connection to the end server are poor.

Figure 10:
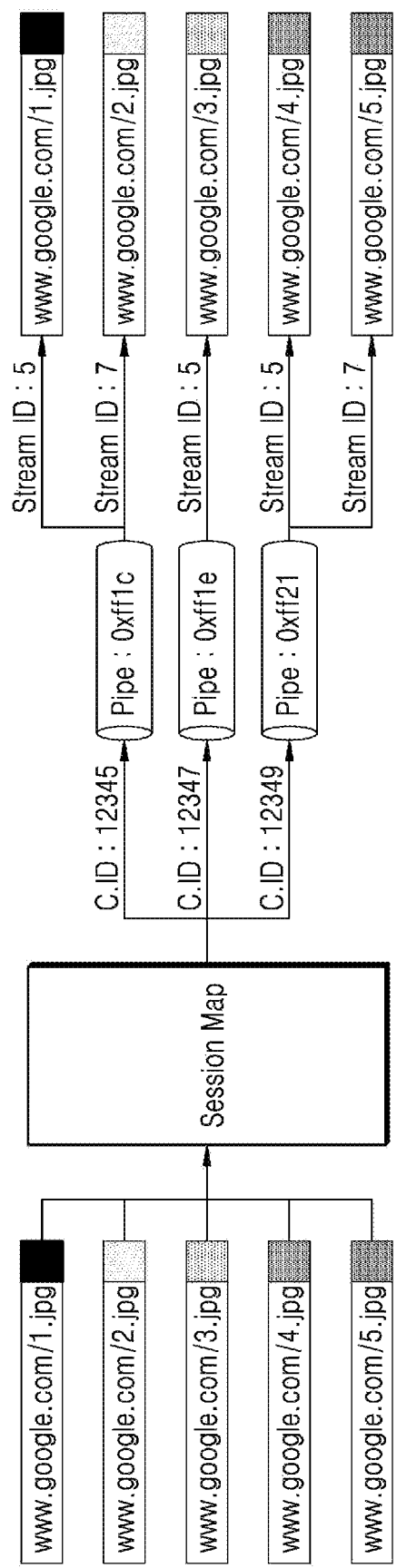
FIG. 10 is an example illustration in which QUIC session creation, after analyzing QUIC level parameters, is depicted, according to an embodiment of the disclosure.

FIG. 10 is an example illustration in which QUIC session creation, after analyzing QUIC level parameters, is depicted, according to an embodiment of the disclosure. FIG. 10 explains that the QUIC sessions are created based on checking the network parameter, so either the network condition is good but connection is poor or vice versa, based on the condition the session maps creates the QUIC sessions.

Figure 11:
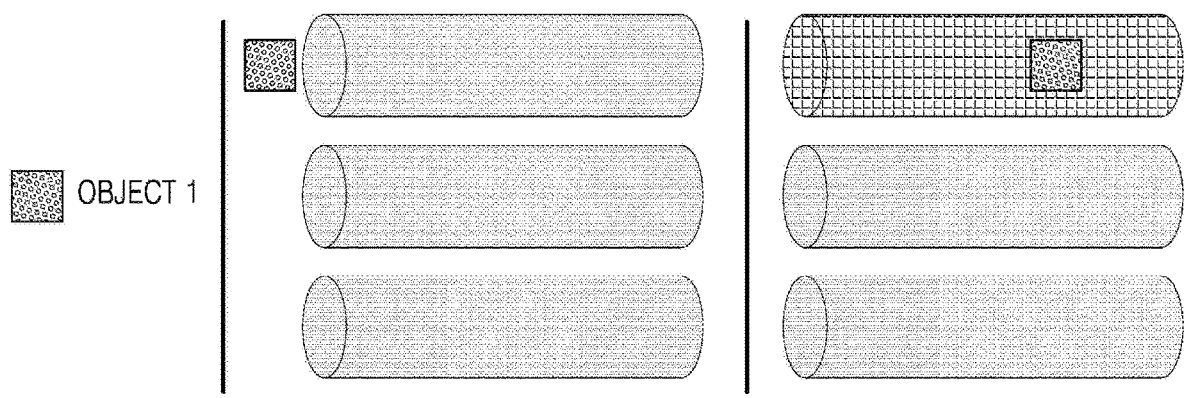
FIG. 11 is an example scenario in which one-shot data path creation is depicted, according to an embodiment of the disclosure.

FIG. 11 is an example scenario in which one-shot data path creation is depicted, according to an embodiment of the disclosure. The creation of multiple data paths may impact the experience mainly for the short live connections. The proposed method approaches for creation of the multi-pipes includes one-shot pipe creation, on-demand pipe creation, and the enhanced on-demand pipe creation. The processor 140 obtains the information about the maximum multi-data path to be created and the connections are created at one-shot and kept ready for the future objects.

Figure 12:
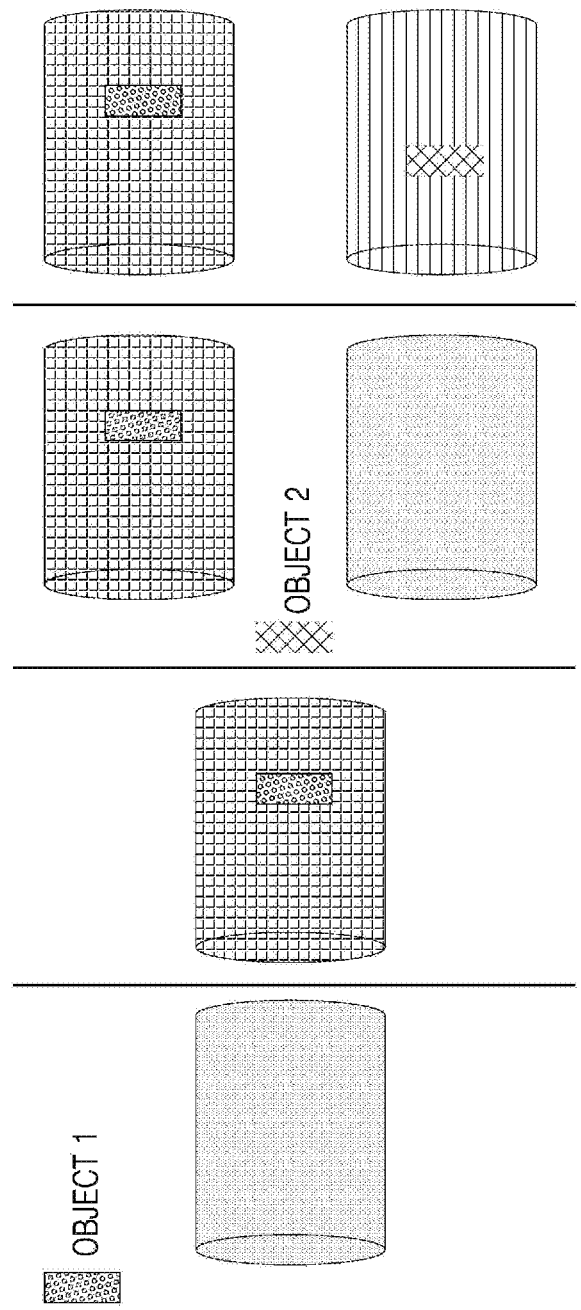
FIG. 12 is an example scenario in which an on-demand data path creation is depicted, according to an embodiment of the disclosure.

FIG. 12 is an example scenario in which an on-demand data path creation is depicted, according to an embodiment of the disclosure. The pipes/data path may be created on-demand basis as when it is required i.e. if the previously created pipe/data path may almost full and doesn't have enough space to fit the new object, the new pipe/new data path may be created. Once there is no more space of the new object, the pipeline may be established and the objects are scheduled. This approach may have a reactive basis. This results in enhancing the user experience.

Figure 13:
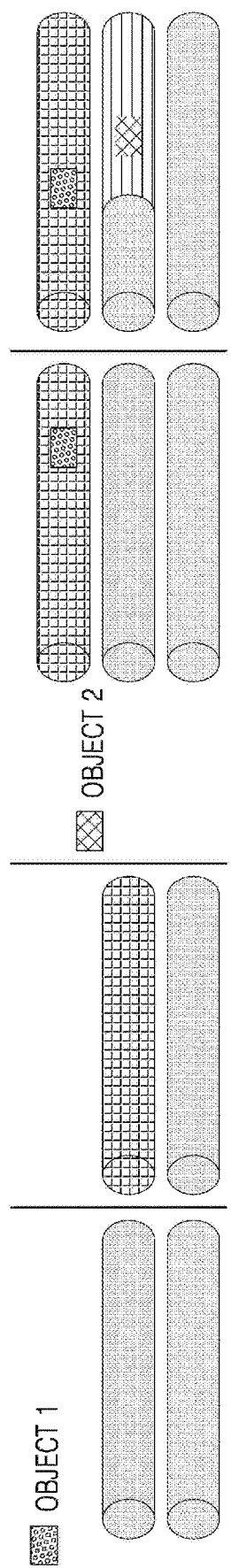
FIG. 13 is an example scenario in which an enhanced on-demand data path creation is depicted, according to an embodiment of the disclosure.

FIG. 13 is an example scenario in which an enhanced on-demand data path creation is depicted, according to an embodiment of the disclosure. In an embodiment, a backup pipe/backup data path is always in existence in the QUIC session. The backup pipe may be used if the existing pipe is full and/or unable to accommodate the new object. If the backup pipe is used, another pipe is created as backup.

Compared to the on-demand pipe creation, the enhanced on-demand pipe creation may pro-actively create an additional pipe/data path to avoid additional overhead of reactively creating the sockets after the object request. Thus reducing the latency. In an example, the on-demand pipe creation is used for 5G URLLC (Ultra Reliable Low Latency Communications) applications.

Figure 14:
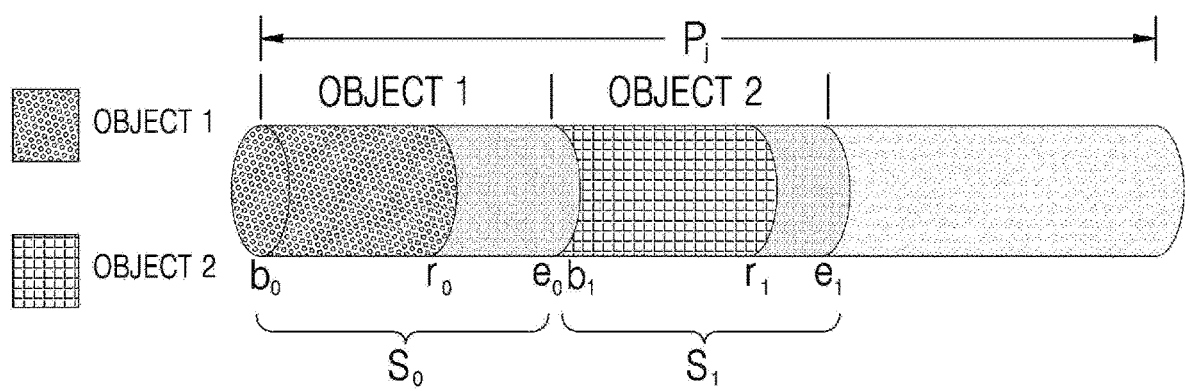
FIG. 14 is a schematic diagram illustrating a burst available estimation for the data path, according to an embodiment of the disclosure.

FIG. 14 is a schematic diagram illustrating a burst available estimation for the data path, according to an embodiment of the disclosure. The processor 140 may detect that the maximum multi data path to be created, the next phase of processor 140 may determine the burst estimation of each pipe. This is dynamic module, which updates the entries on event of object entry or download or completion.

In FIG. 14, bi=Beginning Pivot of object i, ri=Received Pivot of object i, ei=End Pivot of object i, and Si=Total Size of object i Hence, the received size of object i Ri can be written as:

$$R_i \leftarrow r_i - b_i \quad (1)$$

Hence, from (1) total available burst for pipe j can be derived as:

$$BA_j \leftarrow P_j - \sum_{i=1}^{n} R_i \quad (2)$$

Figure 15:
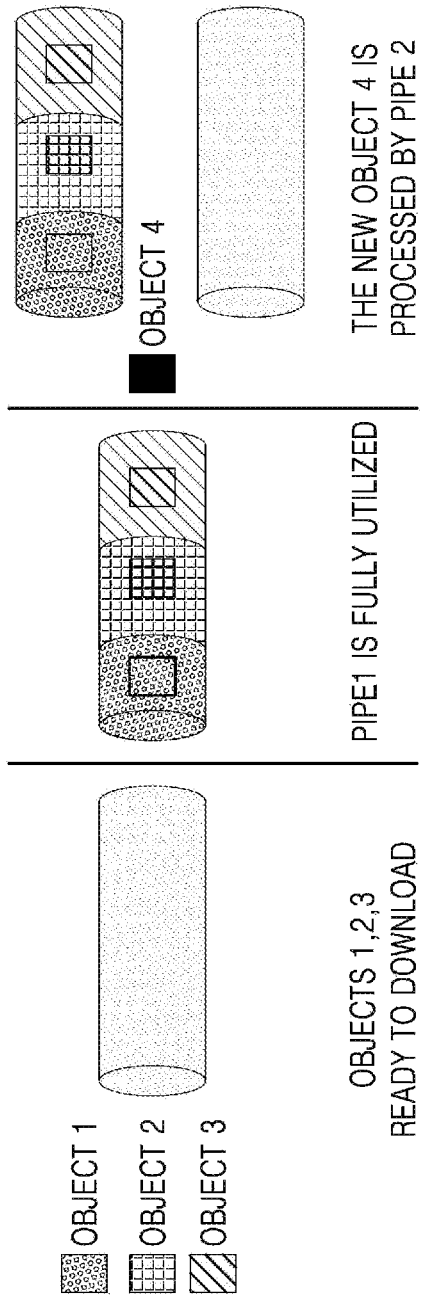
FIG. 15 is a schematic diagram illustrating a CBA MP-QUIC for select the optimal data path amongst all multi-data path, according to an embodiment of the disclosure.
Figure 16:
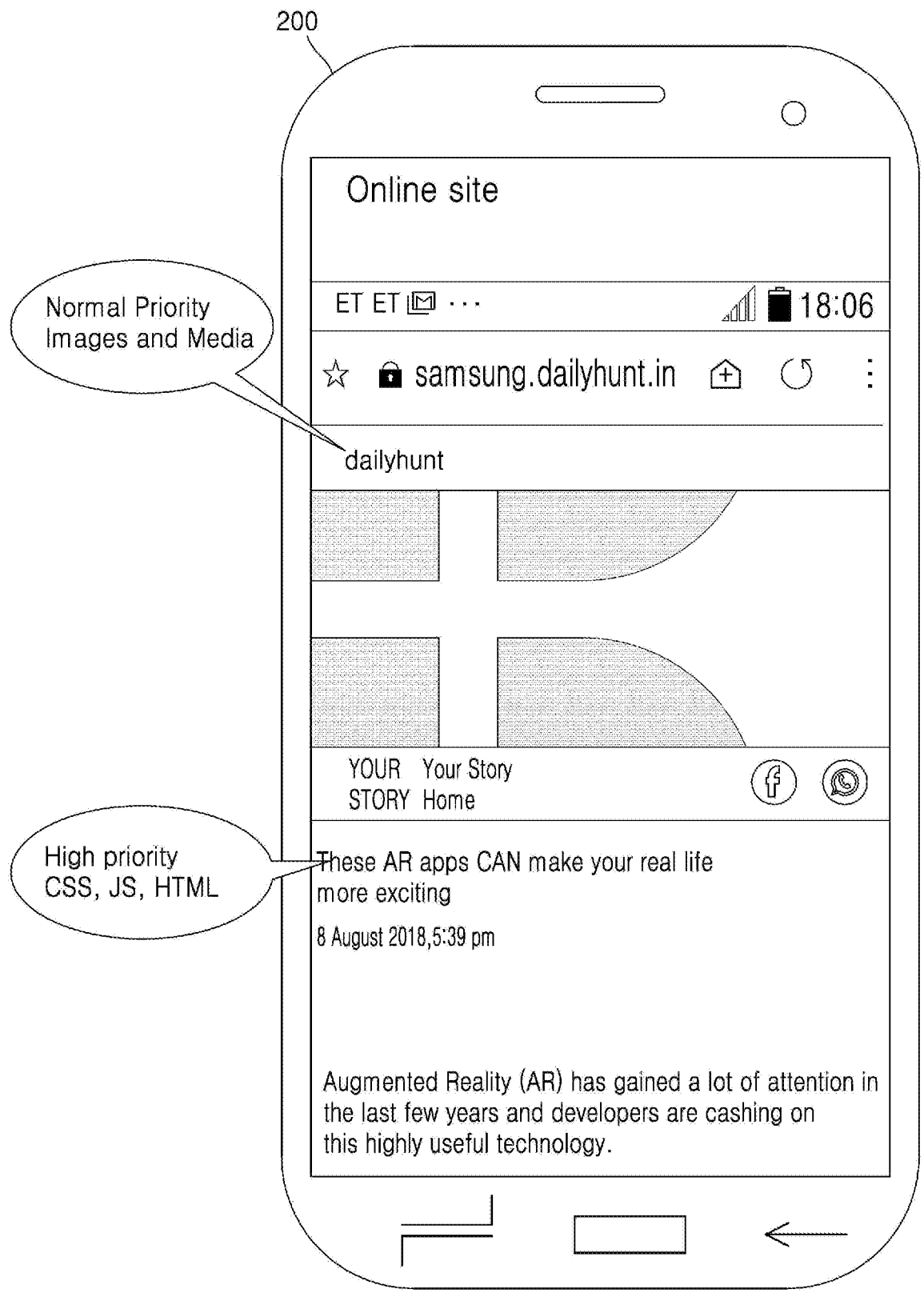
FIG. 16 is an example scenario in which the electronic device prioritize the request based on a content/object awareness, according to an embodiment of the disclosure

FIG. 15 is a schematic diagram illustrating the CBA MP-QUIC for select the optimal data path amongst all multi-data path, according to an embodiment of the disclosure. The below the rule for the proposed method is as follows:
  I. The object gets allocated to the data path with maximum available burst,
  II. The data path is created if and only if it is required, and
  III. Minimal number of data path has to be used at any point of time FIGS. 16-19 are example scenarios in which the electronic device 100 prioritizes the request based on the content/object awareness, according to an embodiment of the disclosure. The electronic device 100 may prioritize the request within the application 110. Based on the proposed method, an intra application object priority may be provided based on content type and the inter application priority may be provided based on application type and URL. As shown in the FIG. 16, the NEWS article is browsed over the processor 140. Based on the proposed methods, the processor 140 will prioritize CSS (Cascading Style Sheet), JSS (Javascript Style Sheet), and HTML (Hyper Text Markup Language) over the media files.

Figure 17:
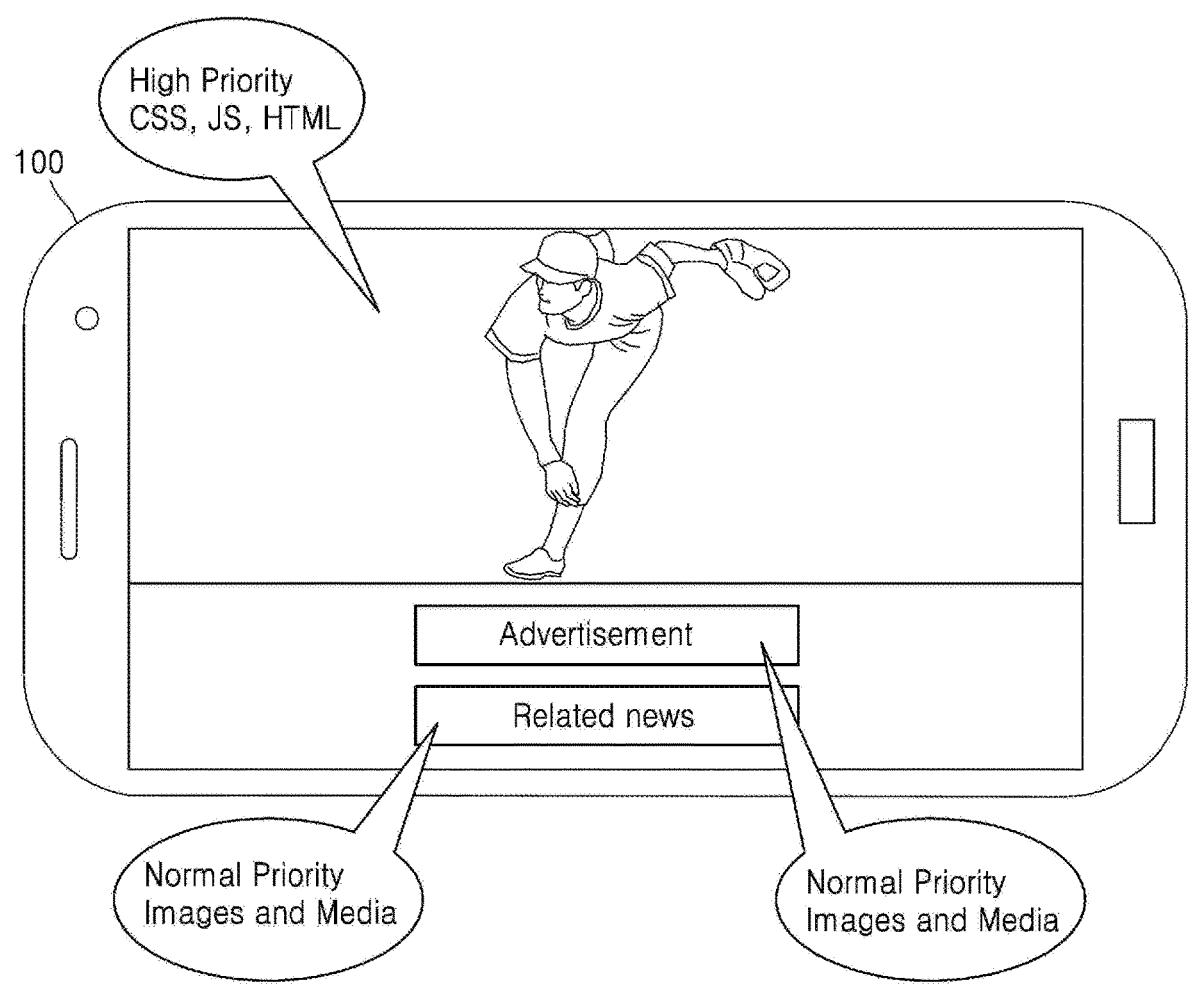
FIG. 17 is an example scenario in which the electronic device prioritize the request based on a content/object awareness, according to an embodiment of the disclosure
Figure 18:
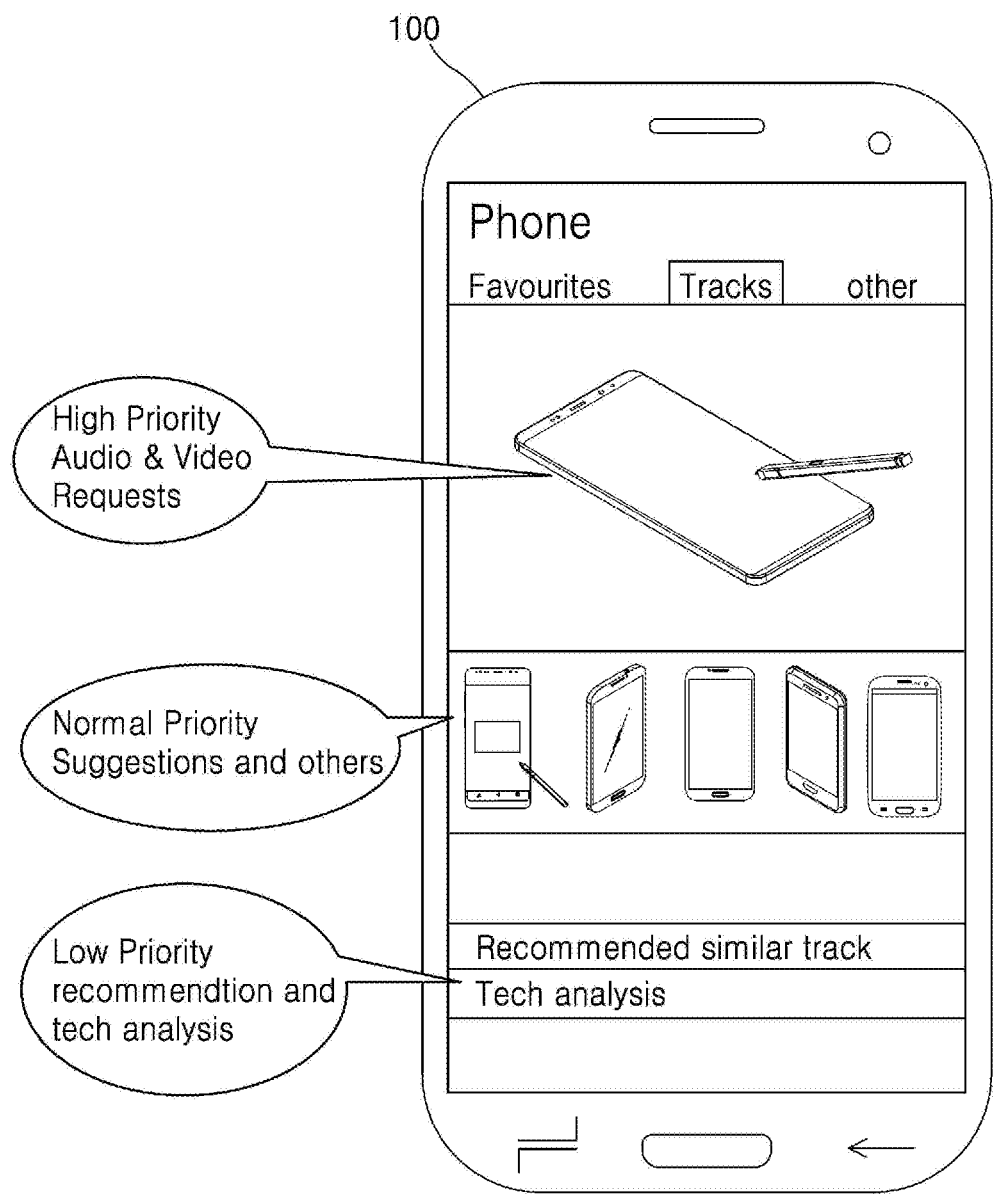
FIG. 18 is an example scenario in which the electronic device prioritize the request based on a content/object awareness, according to an embodiment of the disclosure

As shown in FIG. 17 and FIG. 18, in the video application, the processor 140 may prioritize the media content i.e., video and audio as compared to the thumbnail images, advertisement content etc.

As shown in FIG. 19, the processor 140 may prioritize the request for the favorite applications based on the learning. These application request will be prioritized to the favorite applications compared with the non-favorite application.

In another example, from the activity manager, foreground and background applications can be known. The request from foreground application may be prioritized with respect to the background application requests.

In another example, the current frame of the application may be more prioritized as compared to the previous frames and coming frame. The upcoming frames may be given a normal priority and the frames which are past may be given lower priority. The application priority may be calculated based on the favorite application learning and the application activity.

The embodiments disclosed herein can be implemented using at least one software program running on at least one hardware device and performing network management functions to control the elements.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for handling data path creation in a quick user datagram protocol (UDP) Internet connection (QUIC) session in a wireless network system, comprising:
  receiving, by an electronic device, at least one request from at least one application for processing at least one object;
  determining, by the electronic device, at least one network condition based on a network awareness parameter associated with the electronic device, wherein the network awareness parameter is determined based on a radio condition, and the radio condition is determined based on one or more of interface connection information, Radio Access Technology (RAT) information, or a signal strength observed by the electronic device;
  determining, by the electronic device, a number of data paths to be created within the QUIC session based on the network awareness parameter and at least one property of the at least one object;
  creating, by the electronic device, one or more data paths within the QUIC session based on the determined number of data paths, if the at least one network condition meets a network criterion,
  wherein the creating of the one or more data paths further comprises:
    estimating a buffer size for each data path of the determined number of data paths based on an interface connection; and
    creating, by the electronic device, the one or more data paths based on the determined number of data paths and the buffer size.

2. The method of claim 1, further comprises scheduling the at least one object to be sent over the one or more data paths based on burst information.

3. The method of claim 1, wherein the buffer size is configured based on a plurality of parameters and based on the at least one property of the at least one object.

4. The method of claim 1, wherein the at least one property comprises one or more of a size of the at least one object, a number of the at least one object, or a priority of the at least one object.

5. The method of claim 1, wherein the creating of the one or more data paths further comprises:
   configuring a single data path for data packets of an incoming media stream, wherein the incoming media stream includes the at least one object, the at least one object is to be transmitted through a server, and the incoming media stream is followed by subsequent incoming media streams;
   estimating burst information associated with the incoming media stream and one or more of: i) the network awareness parameter and ii) a connection parameter for the subsequent incoming media streams; and
   creating, the one or more data paths based on the determined number of data paths and the burst information, to accommodate the subsequent incoming media streams.

6. The method of claim 1, wherein the network criterion indicates, based on a plurality of parameters, a utilization of a resource in the QUIC session.

7. An electronic device for handling data path creation in a quick user datagram protocol (UDP) Internet connection (QUIC) session in a wireless network system, comprising:
   a memory storing instructions; and
   at least one processor, wherein execution of the instructions by the at least one processor cause the electronic device to:
   receive at least one request from at least one application for processing at least one object;
   determine at least one network condition based on a network awareness parameter associated with the electronic device, wherein the network awareness parameter is determined based on a radio condition, and the radio condition is determined based on one or more of interface connection information, Radio Access Technology (RAT) information, or a signal strength observed by the electronic device;
   determine a number of data paths to be created within the QUIC session based on the network awareness parameter and at least one property of the at least one object; and
   create one or more data paths within the QUIC session based on the determined number of data paths, if the at least one network condition meets a network criterion,
   wherein the at least one processor is further configured to:
   estimate a buffer size for each data path of the one or more data paths based on an interface connection; and
   create the one or more data paths based on the determined number of data paths and the buffer size.

8. The electronic device of claim 7, wherein the at least one processor is further configured to:
   configure a single data path for data packets of an incoming media stream, wherein the incoming media stream includes the at least one object, the at least one object is to be transmitted through a server, and the incoming media stream is followed by subsequent incoming media streams;
   estimate burst information associated with the incoming media stream and one or more of: i) the network awareness parameter and ii) a connection parameter for the subsequent incoming media streams; and
   create the one or more data paths based on the determined number of data paths and the burst information, to accommodate the subsequent incoming media streams.

* * * * *